United States Patent [19]
Li

[11] Patent Number: 5,293,964
[45] Date of Patent: Mar. 15, 1994

[54] BICYCLE BRAKE DEVICE

[75] Inventor: Jung-Hua Li, Changhua, Taiwan

[73] Assignee: Ah-Ping Lin, Changhua, Taiwan

[21] Appl. No.: 77,218

[22] Filed: Jun. 15, 1993

[51] Int. Cl.$^5$ .............................. B62L 1/08
[52] U.S. Cl. ...................... 188/24.19; 188/24.21
[58] Field of Search .......... 188/24.11, 24.12, 24.19, 188/24.21, 24.22, 250 G

[56] References Cited

U.S. PATENT DOCUMENTS

| | | | |
|---|---|---|---|
| 4,051,924 | 10/1977 | Yoshigai | 188/24.12 |
| 4,546,858 | 10/1985 | Nagano | 188/24.19 |
| 4,938,318 | 7/1990 | Ishibashi | 188/24.19 |
| 5,168,962 | 12/1992 | Yoshigai | 188/24.19 |

*Primary Examiner*—Robert J. Oberleitner
*Assistant Examiner*—Kevin D. Rutherford
*Attorney, Agent, or Firm*—Panitch Schwarze Jacobs & Nadel

[57] ABSTRACT

A bicycle brake device includes a curved brake arm that is formed with an elongated slot, an annular retaining seat that has a front end which is formed with a pair of diametrically opposite retaining notches, an annular support seat that has a rear uneven friction face which abuts against one side of the brake arm, a spring unit that is disposed in the support seat to bias the support seat away from the retaining seat, a washer that is provided with an uneven friction face which abuts against an opposite side of the brake arm, and a bolt that has a spherical head and a threaded shank. The threaded shank extends through the retaining seat, the spring unit, the support seat, the elongated slot of the brake arm and the washer. A portion of the spherical head extends into the retaining seat. A brake block has a front face which is provided with a brake pad and a rear face which is provided with a shaft projection that is connected removably to the spherical head and that engages the retaining notches of the retaining seat. A nut engages a distal end of the threaded shank and is rotated relative to the threaded shank so as to retain the spring unit in a compressed state and permit knurled end surfaces of the retaining seat and the support seat to engage one another.

1 Claim, 6 Drawing Sheets

5,293,964

BICYCLE BRAKE DEVICE

BACKGROUND OF THE INVENTION

Field of the Invention

The invention relates to a bicycle brake device, more particularly to an adjustable bicycle brake device which is easy to assemble and disassemble.

Description of the Related Art

Referring to FIG. 1, a conventional bicycle brake device (10) is shown to comprise a bolt (11), a brake block (12), a first washer (13), a brake arm (14), a second washer (15) and a nut (16).

The bolt (11) has a spherical head (111) and a threaded shank (112). The spherical head is (111) is formed with a diametrical through hole (113) that is transverse to the threaded shank (112) and a hexagonal hole (114) that is aligned axially with the threaded shank (112) and that is communicated with the through hole (13). The brake block (12) has a front face which is provided with a brake pad (121) and a rear face which is provided with a shaft projection (122) that extends through the through hole (113) of the bolt (11). The brake arm (14) is a curved arm member which is formed with an elongated slot (141) therethrough. The first and second washers (13, 15) are disposed on two sides of the brake arm (14) and are each provided with an uneven friction face (131, 151) that is in contact with the respective side of the brake arm (14). The threaded shank (112) extends through the first washer (13), the elongated slot (141) of the brake arm (14) and the second washer (15), and engages threadably with the nut (16).

When the nut (16) is tightened, the uneven friction face (151) of the second washer (15) abuts tightly against the brake arm (14), and a portion of the spherical head (111) of the bolt (11) extends into an axial space (132) that is confined by the first washer (13) and presses against the latter to press the uneven friction face (131) of the first washer (13) against the brake arm (14). The shaft projection (122) of the brake block (12) presses tightly against the first washer (13) at this stage so as to secure the brake block (12) on the brake arm (14), as shown in FIG. 3.

Referring to FIG. 2, the conventional brake device (10) is installed on each of the prongs (A1) of a bicycle fork (A). The brake arm (14) of each brake device (10) has a lower end mounted pivotally on the respective prong (A1) and an upper end connected to a yoke cable (B). When a brake lever (not shown) is operated, the yoke cable (B) pulls the brake arms (14), thus causing the brake arms (14) to pivot in order to move the brake blocks (12) to contact a wheel rim of a bicycle wheel (not shown) that is mounted rotatably on the bicycle fork (A), thereby braking the bicycle wheel.

The main drawback of the conventional brake device (10) is that it cannot be conveniently disassembled. Referring once more to FIG. 3, when a wrench (17) is operated so as to remove the nut (16) from the bolt (11), rotation of the first and second washers (13, 15) is prevented due to contact between the uneven friction faces (131, 151) and the respective sides of the brake arm (14). However, because the first washer (13) has a smooth face (133) opposite to the uneven friction face (131), the first washer (13) is unable to prevent relative rotation of the bolt (11). Thus, the rotation of the nut (16) causes the bolt (11) to rotate therewith, thereby preventing the removal of the nut (16) from the bolt (11).

In order to prevent the rotation of the bolt (11), one end of an Allen wrench (18) is inserted within the hexagonal hole (114) in the spherical head (111). One hand of the user rotates the wrench (17), while the other hand of the user grasps the Allen wrench (18) to prevent the bolt (11) from rotating with the nut (16), thereby permitting disassembly of the brake device (10).

However, when installing the brake device (10), it is sometimes necessary to adjust the position of the brake block (12) in order to achieve effective contact between the brake pad (121) and the wheel rim (19) of a bicycle wheel. Since the two hands of the user respectively grasp the wrench (17) and the Allen wrench (18), the position of the brake block (12) cannot be adjusted without the help of a second person.

SUMMARY OF THE INVENTION

Therefore, the objective of the present invention is to provide an adjustable bicycle brake device which requires only one person and one tool when assembling and disassembling the same.

Accordingly, the bicycle brake device of the present invention is to be installed on a bicycle frame which has a bicycle wheel mounted rotatably thereto and comprises:

a curved brake arm formed with an elongated slot therethrough and adapted to be mounted pivotally on the bicycle frame;

a metal annular retaining seat confining a hollow space therein and having a front end which is formed with a pair of diametrically opposite retaining notches, a rear end which is formed with an annular inward flange, and a knurled rear end surface;

a metal annular support seat confining a hollow space therein and having a knurled front end surface, a rear end which is formed with an annular inward flange and a rear uneven friction face which abuts against one side of the brake arm;

a spring unit which is disposed in the hollow space of the support seat and which has two ends that abut respectively against the flange of the support seat and the flange of the retaining seat;

a washer provided with an uneven friction face that abuts against an opposite side of the brake arm;

a bolt having a spherical head and a threaded shank, the spherical head being formed with a diametrical through hole that is transverse to the threaded shank, the threaded shank extending through the retaining seat, the spring unit, the support seat, the elongated slot of the brake arm and the washer, a portion of the spherical head extending into the hollow space of the retaining seat;

a nut engaging a distal end of the threaded shank and being rotated relative to the threaded shank so as to retain the spring unit in a compressed state and permit the knurled end surfaces of the retaining seat and the support seat to engage one another; and a brake block having a front face which is provided with a brake pad and a rear face which is provided with a shaft projection that extends through the through hole of the bolt and that engages the retaining notches of the retaining seat, the brake arm being pivoted so as to move the brake block to contact the bicycle wheel in order to brake the bicycle wheel.

BRIEF DESCRIPTION OF THE PRESENT INVENTION

Other features and advantages of the present invention will become apparent in the following detailed description of the preferred embodiment, with reference to the accompanying drawings, of which:

DETAILED DESCRIPTION OF THE PREFERRED EMBODIMENT

Figure 1:
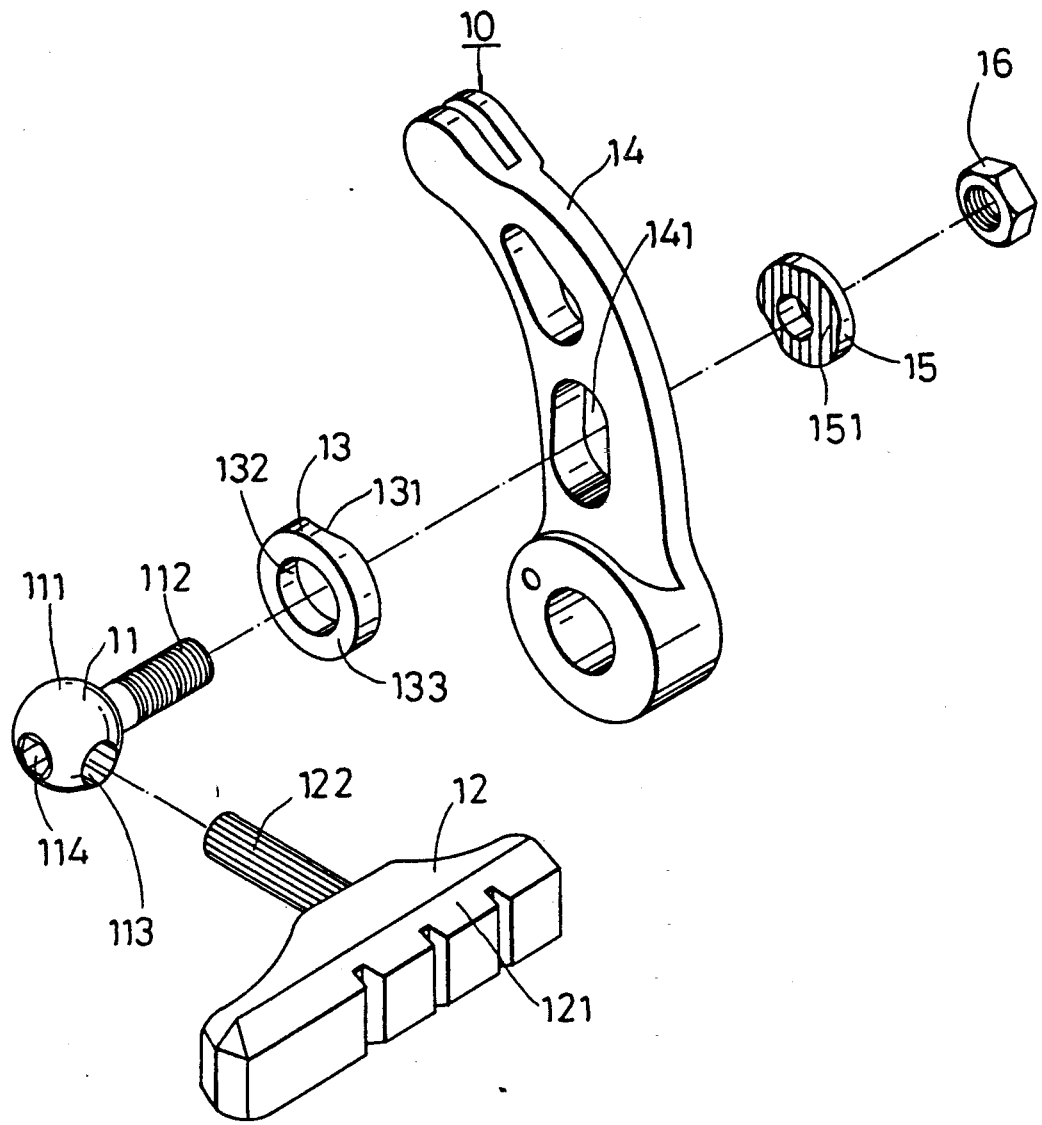
FIG. 1 is an exploded view of a conventional bicycle brake device.
Figure 2:
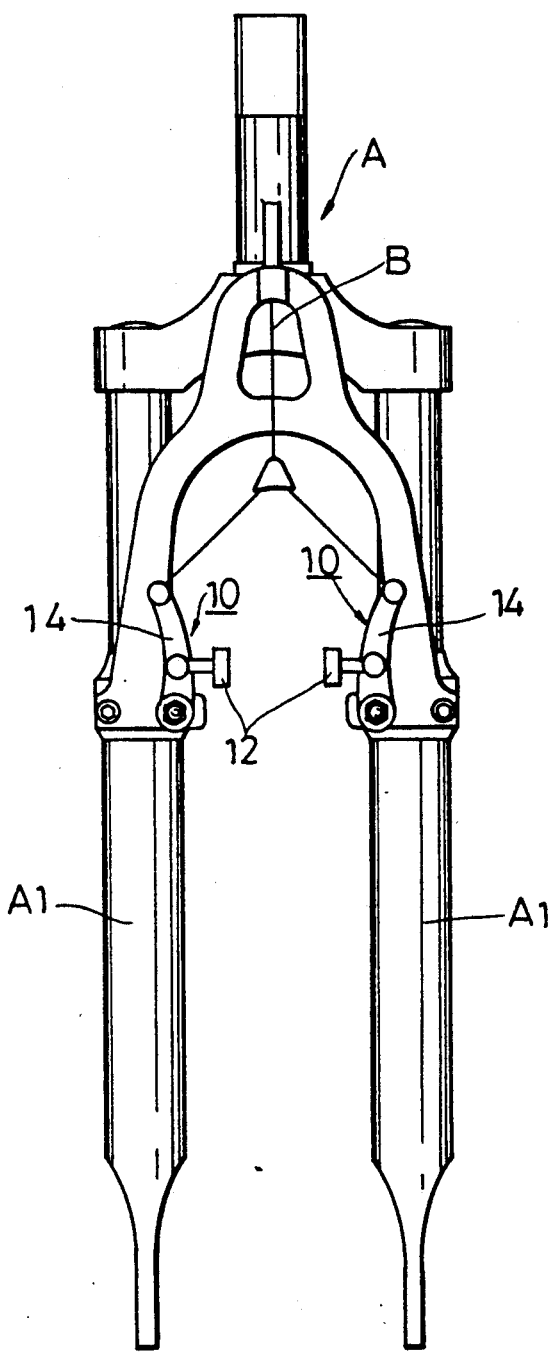
FIG. 2 illustrates the conventional bicycle brake device when installed on a bicycle fork.
Figure 3:
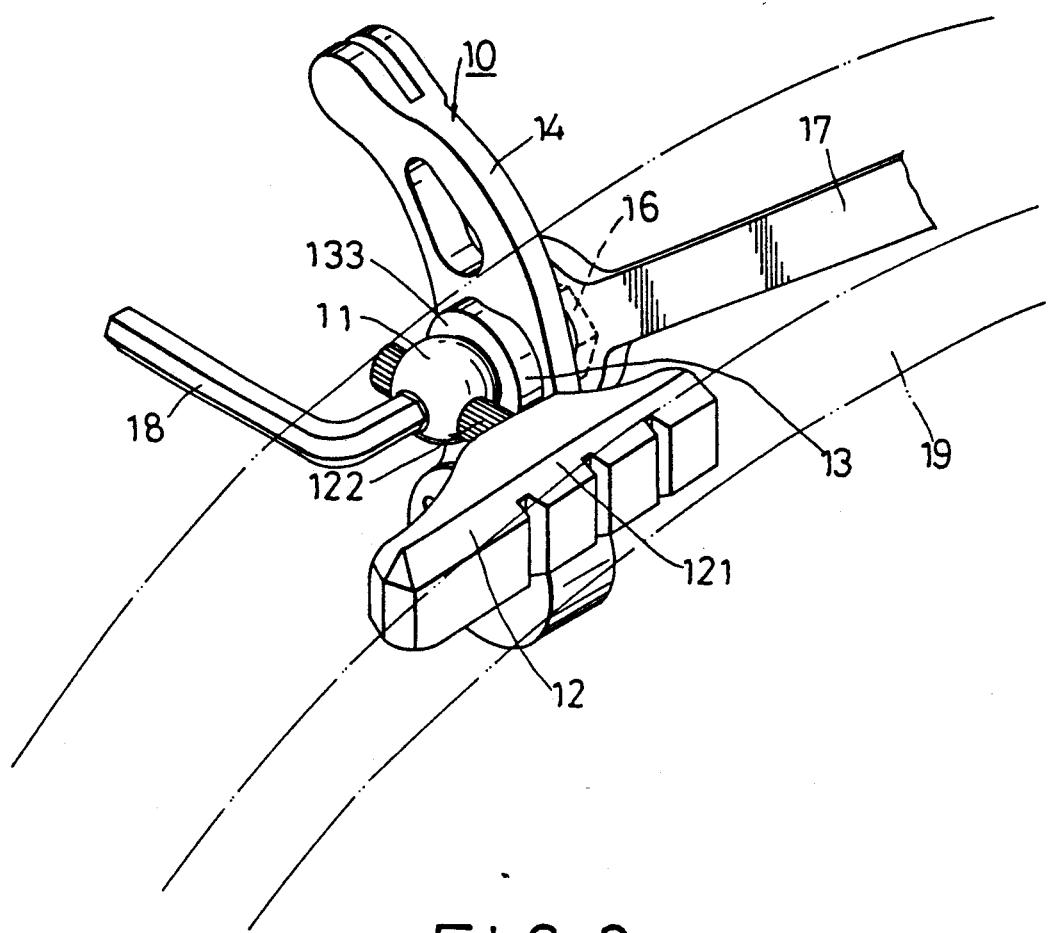
FIG. 3 illustrates the procedure for disassembling the conventional bicycle brake device.
Figure 4:
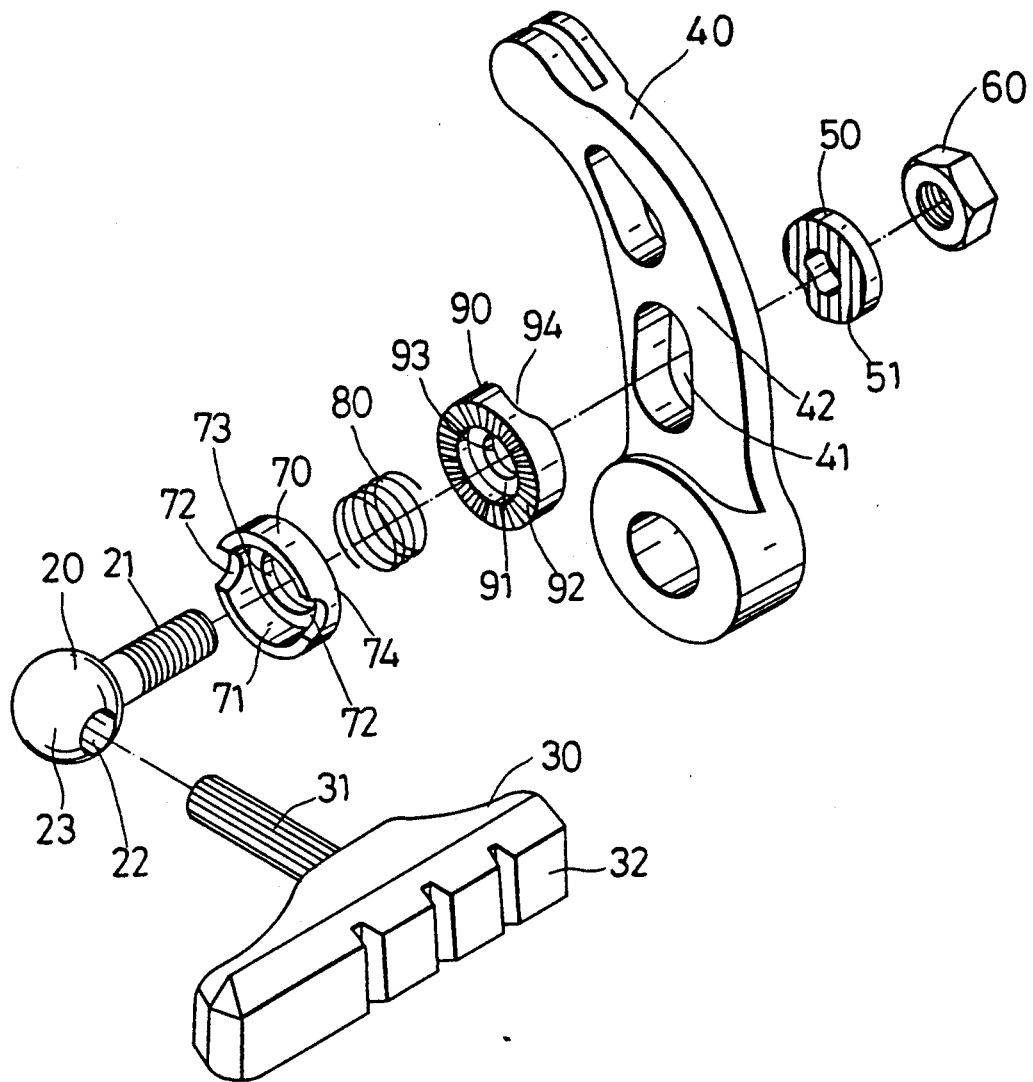
FIG. 4 is an exploded view of the preferred embodiment of a bicycle brake device according to the present invention.

Referring to FIG. 4, the preferred embodiment of a bicycle brake device according to the present invention is shown to comprise a bolt (20), a brake block (30), a a brake arm (40), a washer (50), a nut (60), an annular retaining seat (70), a spring unit (80) and an annular support seat (90).

The bolt (20) has a spherical head (23) and a threaded shank (21). The spherical head (23) is formed with a diametrical through hole (22) that is transverse to the threaded shank (21). The brake block (30) has a front face which is provided with a brake pad (32) and a rear face which is provided with a shaft projection (31) that extends through the through hole (22) of the bolt (20). The brake arm (40) is a curved arm member which is formed with an elongated slot (41) therethrough and which has a front face with a slightly convex portion (42). The washer (50) is disposed on a rear side of the brake arm (40) and is provided with an uneven friction face (51) that is in contact with the rear side of the brake arm (40). The annular retaining seat (70) is made of metal and confines a hollow space (71). The retaining seat (70) has a front end that is formed with a pair of diametrically opposite retaining notches (72), a rear end that is formed with an annular inward flange (73), and a knurled rear end surface (74). The annular support seat (90) is made of metal and confines a hollow space (91). The support seat (90) has a knurled front end surface (92), a rear end which is formed with an annular inward flange (93) and a rear uneven friction face (94) which is slightly concave. The spring unit (80) is a helical compression spring which is disposed in the hollow space (91) of the support seat (90) and which has two ends that abut respectively against the inward flange (93) of the support seat (90) and the inward flange (73) of the retaining seat (70).

During assembly, the threaded shank (21) of the bolt (20) extends through the inward flange (73) of the retaining seat (70), the spring unit (80), the inward flange (93) of the support seat (90), the elongated slot (41) of the brake arm (40) and the washer (50), and engages threadably with the nut (60).

Figure 5:
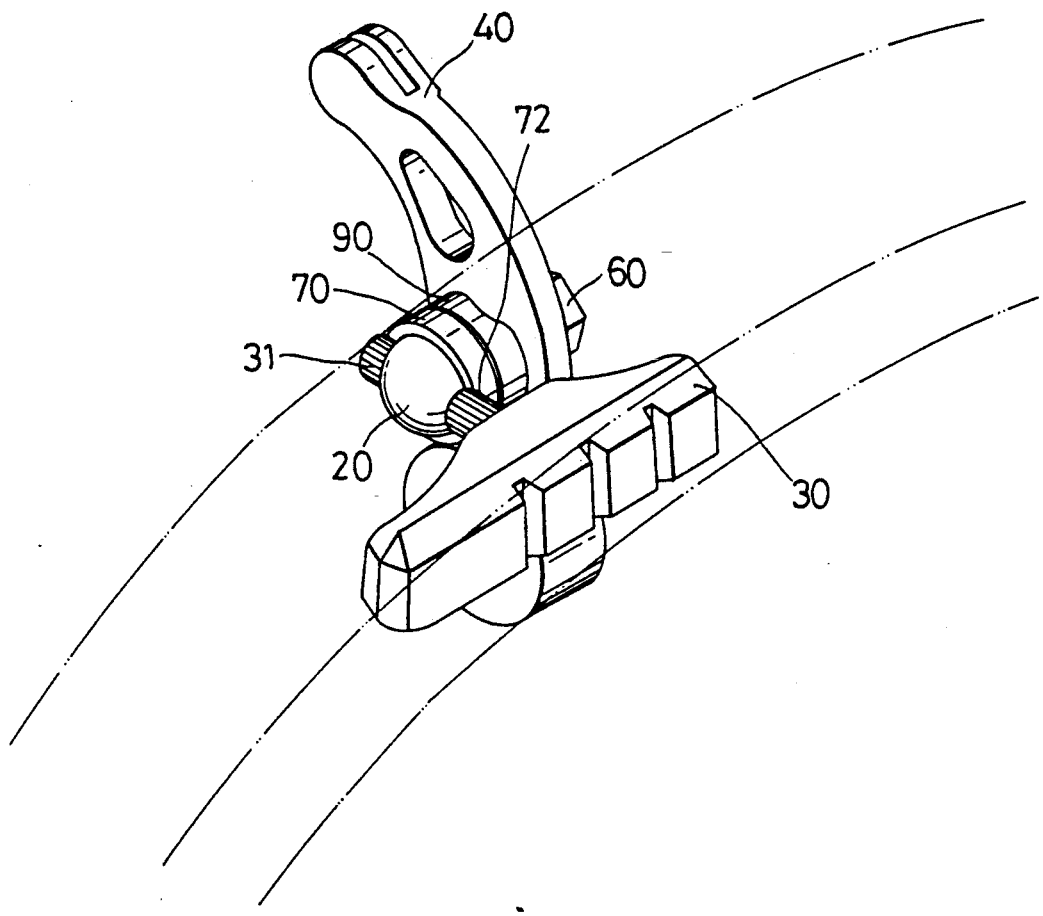
FIG. 5 is an assembled view of the preferred embodiment.

Referring to FIGS. 4 and 5, when the nut (60) is tightened, the uneven friction face (51) of the washer (50) presses tightly against the brake arm (40), and a portion of the spherical head (23) of the bolt (20) extends into the hollow space (71) that is confined by the retaining seat (70) and presses the shaft projection (31) to engage the retaining notches (72) of the retaining seat (70). The retaining seat (70) compresses the spring unit (80) and abuts against the support seat (90), thereby causing the uneven friction face (94) of the support seat (90) to press against the slightly convex portion (42) of the brake arm (40). The knurled end surfaces (74, 92) of the retaining seat (70) and the support seat (90) engage one another at this stage to prevent rotation of the retaining seat (70) relative to the support seat (90). The uneven friction face (94) of the support seat (90) conforms with the curvature of the slightly convex portion (42) of the brake arm (40) to ensure that rotation of the support seat (90) relative to the brake arm (40) does not occur.

Referring once more to FIG. 5, when a wrench (not shown) is operated so as to remove the nut (60) from the bolt (20), rotation of the bolt (20) is prevented by the retaining seat (70). Thus, only one tool is required when disassembling the brake device of the present invention. The other hand of the user is free to move the brake block (30) if it is desired to adjust the position of the latter in order to achieve effective contact between the brake pad (32) and the wheel rim (shown in phantom lines) of a bicycle wheel.

Figure 6:
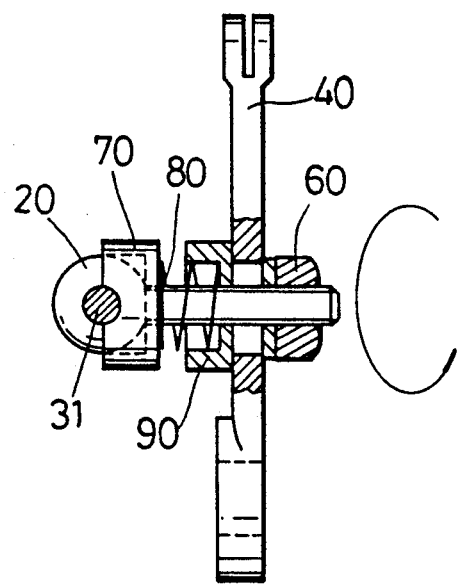
FIG. 6 is a partly sectional view illustrating how the preferred embodiment is disassembled.

Referring to FIG. 6, if it is desired to replace the brake block (30) of the brake device of the present invention, the nut (60) is simply rotated relative to the threaded shank of the bolt (20). The spring unit (80) expands, thereby moving the retaining seat (70) away from the support seat (90). The brake block (30) can be conveniently replaced at this stage.

It has thus been shown that assembly, disassembly, repair and adjustment of the bicycle brake device of the present invention can be accomplished by only one person with the use of only one tool.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle brake device to be installed on a bicycle frame which has a bicycle wheel mounted rotatably thereto, comprising:

a curved brake arm formed with an elongated slot therethrough and adapted to be mounted pivotally on said bicycle frame;

a metal annular retaining seat confining a hollow space therein and having a front end which is formed with a pair of diametrically opposite retaining notches, a rear end which is formed with an annular inward flange, and a knurled rear end surface;

a metal annular support seat confining a hollow space therein and having a knurled front end surface, a rear end which is formed with an annular inward flange and a rear uneven friction face which abuts against one side of said brake arm;

a spring unit which is disposed in said hollow space of said support seat and which has two ends that abut respectively against said flange of said support seat and said flange of said retaining seat;

a washer provided with an uneven friction face that abuts against an opposite side of said brake arm;

a bolt having a spherical head and a threaded shank, said spherical head being formed with a diametrical through hole that is transverse to said threaded shank, said threaded shank extending through said retaining seat, said spring unit, said support seat, said elongated slot of said brake arm and said washer, a portion of said spherical head extending into said hollow space of said retaining seat;

a nut engaging a distal end of said threaded shank and being rotated relative to said threaded shank so as to retain said spring unit in a compressed state and permit said knurled end surfaces of said retaining seat and said support seat to engage one another; and a brake block having a front face which is provided with a brake pad and a rear face which is provided with a shaft projection that extends through said through hole of said bolt and that engages said retaining notches of said retaining seat, said brake arm being pivoted so as to move said brake block to contact said bicycle wheel in order to brake said bicycle wheel.

* * * * *